(12) United States Patent
Singhal

(10) Patent No.: US 7,254,560 B2
(45) Date of Patent: Aug. 7, 2007

(54) METHOD AND APPARATUS FOR AN INTEGRATED IDENTITY SECURITY AND PAYMENT SYSTEM

(76) Inventor: Tara C. Singhal, P.O. Box 5075, Torrance, CA (US) 90510

( * ) Notice: Subject to any disclaimer, the term of this patent is extended or adjusted under 35 U.S.C. 154(b) by 396 days.

(21) Appl. No.: 10/014,040

(22) Filed: Dec. 10, 2001

(65) Prior Publication Data

US 2002/0073044 A1    Jun. 13, 2002

Related U.S. Application Data

(60) Provisional application No. 60/270,750, filed on Feb. 21, 2001, provisional application No. 60/255,002, filed on Dec. 9, 2000.

(51) Int. Cl.
*G06Q 99/00* (2006.01)
(52) U.S. Cl. .............. 705/64; 705/72; 705/75
(58) Field of Classification Search ............ 705/65, 705/40, 41, 35, 64, 72, 75
See application file for complete search history.

(56) References Cited

U.S. PATENT DOCUMENTS

| | | |
|---|---|---|
| 4,868,376 A | 9/1989 | Lessin et al. |
| 5,276,311 A | 1/1994 | Hennige |
| 5,329,589 A * | 7/1994 | Fraser et al. ............ 379/91.02 |
| 6,038,548 A | 3/2000 | Kamil |
| 6,076,075 A * | 6/2000 | Teicher ..................... 705/41 |
| 6,295,482 B1 | 9/2001 | Tognazzini |
| 6,327,578 B1 * | 12/2001 | Linehan ................... 705/65 |

FOREIGN PATENT DOCUMENTS

| | | | |
|---|---|---|---|
| DE | 19903363 A | | 8/2000 |
| EP | 0910 028 A | | 4/1999 |
| EP | 1093097 A | | 4/2001 |
| JP | 02003141650 A | * | 5/2003 |
| WO | WO 97/45814 A | | 12/1997 |

OTHER PUBLICATIONS

European Search Rpt. Jan. 18, 2005, European Srch R.

* cited by examiner

*Primary Examiner*—Pierre Eddy Elisca
(74) *Attorney, Agent, or Firm*—Steve Roeder, Esq.

(57) ABSTRACT

An identity security system (10) that reduces the likelihood of identity theft and fraud includes a central system (12) and a portable wireless device (15). The central system (12) stores personal data of a party including information regarding one or more payment cards of the party, one or more bank accounts of the party, driver license data of the party, and/or other identification data of the party. The wireless device (15) electronically connects to the central system (12). With the present system, using the wireless device (15), the party can pay for a transaction using the one or more of the payment cards, cause funds to be transferred to or from the bank accounts and/or provide identifying data if necessary.

4 Claims, 16 Drawing Sheets

FIGURE 3A

Customer Identifier database 38A

| Customer Identifier 320 | Portable Device Id. 321 | Sequence Numbers 330 |
|---|---|---|
| xxxx-xx-xx-xx | 6264517222 | 00001 |
| xxxx-xx-xx-xx | 2645172212 | 00002 |
| xxxx-xx-xx-xx | 6934517232 | 00003 |
| ...... | | |
| ...... | | |
| xxxx-xx-xx-xx | | 0000N |

FIGURE 3B

Identifying data database 38B

| Identifying name data 322A | Identifying address data 322B | Identifying address data 322C |
|---|---|---|
| Sequence #1 330<br>Jane Corky Doe 350A | Sequence #1 330<br>4555 Main St. 350B | Sequence #1 330<br>Tuscany, NY 90511 350C |
| Sequence #2 330<br>Michael Miliken Smith | Sequence #2 330<br>4555 Power St. | Sequence #2 330<br>Albany, GA 42256 |
| Sequence #3 330 | Sequence #3 330 | Sequence #3 330 |
| ...... | ...... | ...... |

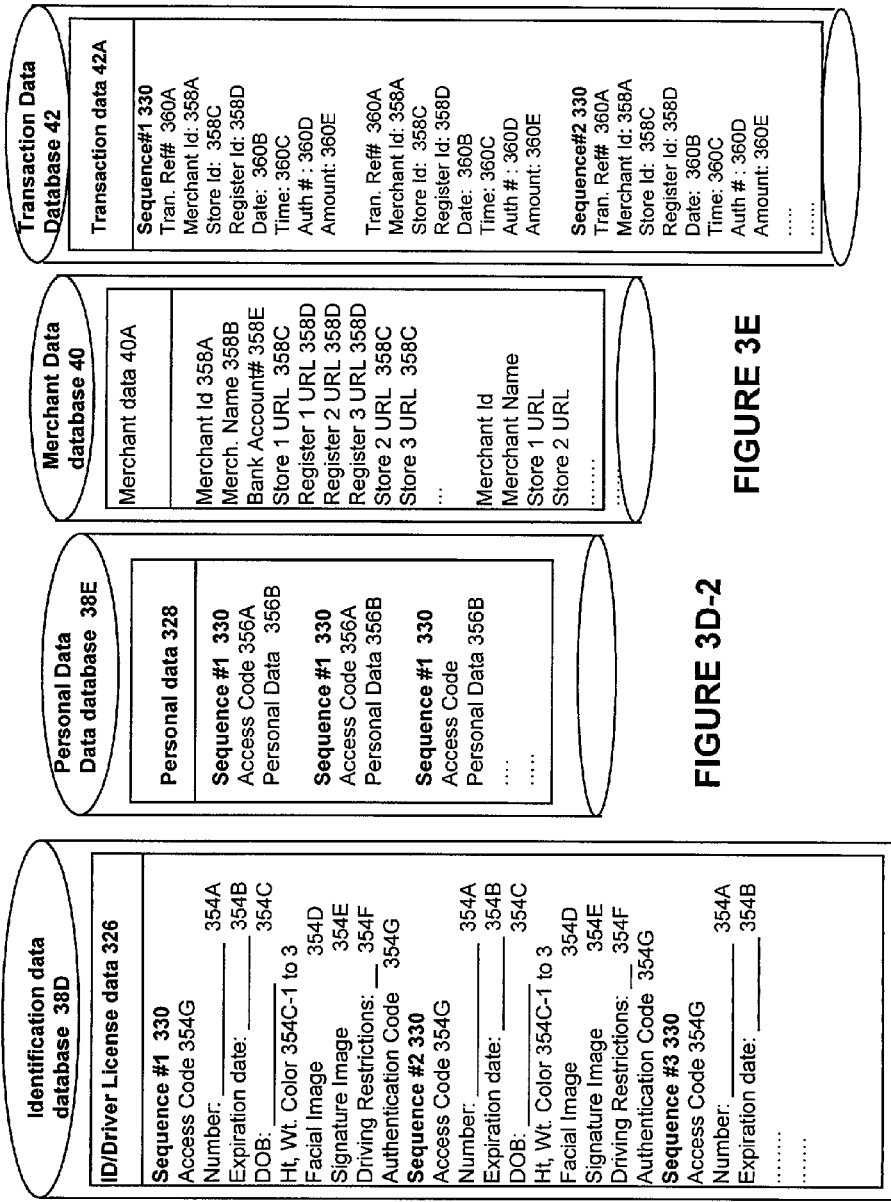

FIGURE 4B

CENTRAL SYSTEM CUSTOMER WEB PAGE 402

Personal Data Form 424A:
Identifying data 322
Name: 350A
First: _____ Middle: _____ Last: _____
Street Address: _____ 350B
City: _____ State _____ ZIP _____ 350C

SEND 416

FIGURE 4C

CENTRAL SYSTEM CUSTOMER WEB PAGE 404

Payment card data form 424B
Payment card data 324
Item card number 352A    date 352B    PIN 352C    Access code 352D
1. xxxxxxxxxxxxxxxxxx    xx/xx                    xxxx
2. xxxxxxxxxxxxxxxxxx    xx/xx        xxxx        xxxx
3. xxxxxxxxxxxxxxxxxx    xx/xx                    xxxx

SEND 418

FIGURE 4D

CENTRAL SYSTEM CUSTOMER WEB PAGE 406

ID/Driver License data form 424C
Driver License data 326
Number: _____ 354A  DOB: _____ 354C Access Code: _____ 354G
☐ Customer authorize verification/retrieval from DMV Records 424C-1
Name _____ 350A  St. Address _____ 350B  City/State _____ 350C
Expiration date: _____ 354B Height 354C-1  Weight 354F
Color or hair/eyes 354C-3  Driver Restrictions 354F
Facial Image   354D   Signature Image   354E

SEND 420

FIGURE 4E

CENTRAL SYSTEM CUSTOMER WEB PAGE 408

Personal Data form 424D
Personal data 328
Access Code: _____ 356A
Data _____ 356B

SEND 422

FIGURE 4F

Central System Customer Web page 410

Transaction Data 42A

| Date 360B | Time 360C | Tran Ref# 360A | Auth # 360D | $$ Amount 360E |
|---|---|---|---|---|
| Merchant ID: 358A TUSON Market 358B | | | | |
| 030300 | 1950 | 623451 | 321456 | 12.62 |
| 040400 | 2250 | 223451 | 123356 | 42.26 |
| 050400 | 2350 | 723456 | 848456 | 29.52 |
| Merchant ID: 358A Henry Hot House 358B | | | | |
| 030700 | 1650 | 323456 | 372456 | 32.62 |
| Merchant ID: 358A John Gas Station 358B | | | | |
| 030100 | 2050 | 223456 | 332156 | 12.62 |
| 030500 | 2850 | 523456 | A33957 | 17.40 |

Figure 6A

Central System Merchant Web page 522

Merchant ID: _____ 358A
Bank Account # _____ 358E
Select Payment Transaction
Delivery Method 570
572
Pull Option ☐ Enter User Id _____ 574
576
Push Option ☐ Enter List of store URLs 578

Store 1    URL 358C
Register 1 URL 358D
Register 2 URL 358D
Store 2    URL 358C
..........

Figure 6B

Central System Merchant Web page 520

Merchant Id _____ 358A-B
Store ID _____ 358C
Register ID _____ 358D

| Date 360B | Time 360C | Tran Ref# 360A | Auth # 360D | $$ Amount 360E |
|---|---|---|---|---|
| 030300 | 2050 | 123456 | 123356 | 72.12 |
| 030300 | 2051 | 223457 | 232457 | 52.62 |
| 030300 | 2052 | 223458 | 887458 | 42.22 |
| 030300 | 2053 | 223459 | 342459 | 22.32 |

570

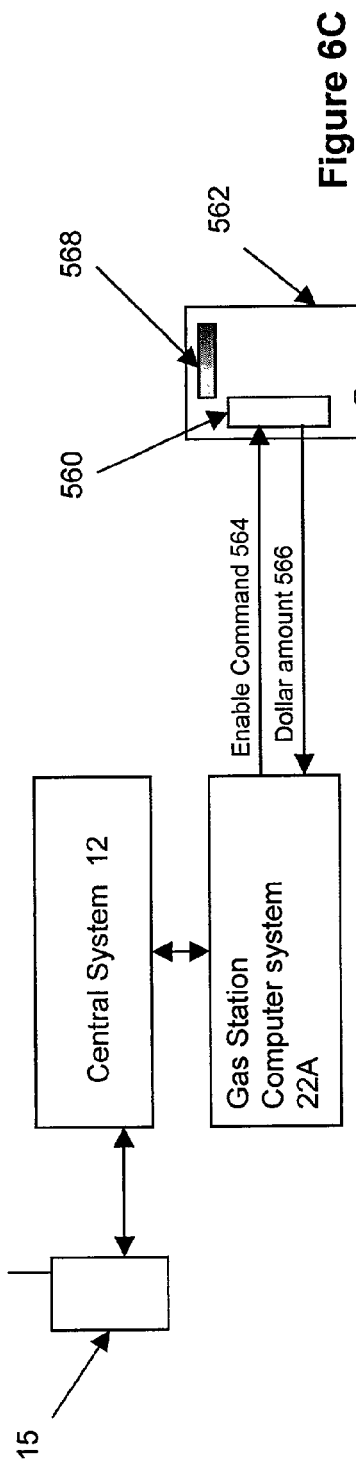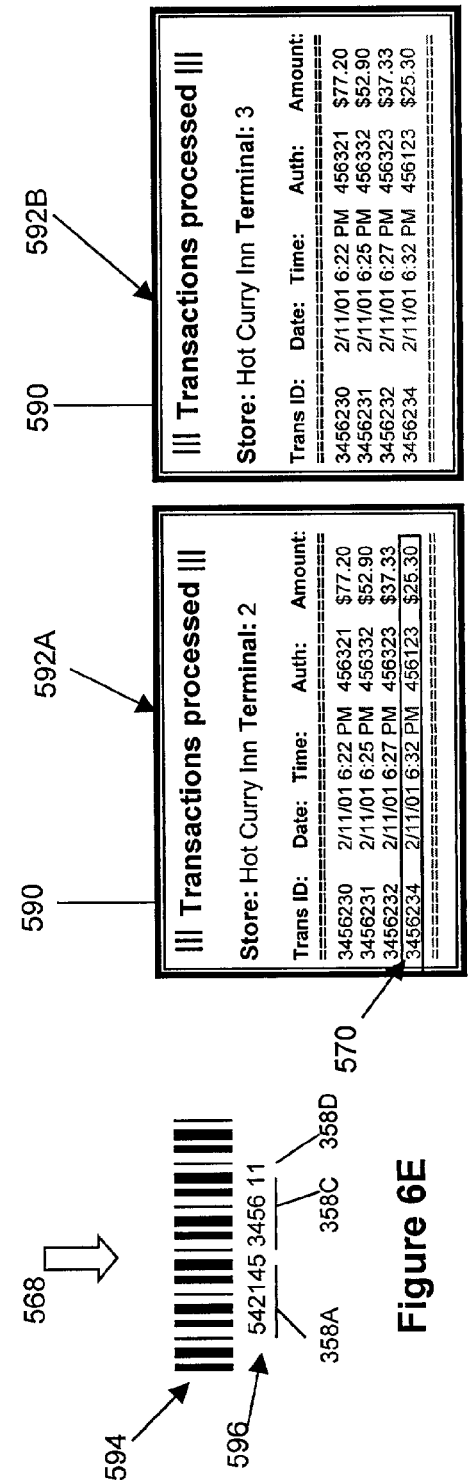

METHOD AND APPARATUS FOR AN INTEGRATED IDENTITY SECURITY AND PAYMENT SYSTEM

CROSS REFERENCE TO RELATED APPLICATIONS

This application claims priority on Provisional Application Ser. No. 60/255,002, entitled "Method and Apparatus for an Integrated Identity Security and Payment system," filed on Dec. 9, 2000, by Tara Chand Singhal. The contents of Provisional Application Ser. No. 60/255,002 are incorporated herein by reference.

This application also claims priority on Provisional Application Ser. No. 60/270,750, entitled "Method and Apparatus for an Integrated Identity Security and Payment system," filed on Feb. 21, 2001, by Tara Chand Singhal. The contents of Provisional Application Ser. No. 60/270,750 are incorporated herein by reference.

FIELD OF THE INVENTION

The present invention is directed to a method and apparatus for a personal identity security system that inhibits identity theft and fraud. Further, the present invention is directed to a method and apparatus that facilitates payment of transactions without disclosing personal data.

BACKGROUND

People usually carry with them a wallet containing a driver license. A typical driver license provides the name, the date of birth, the address, the signature, and the license number of the driver. Some states use the social security number as the driver license number. Additionally, the wallet can contain money, checks, and/or one or more types of payment cards. The payment cards may be charge cards, debit cards, check cards, and merchant cards specific to a merchant. Typically, these payment cards include the customer name, card number, expiration date and a magnetic strip with the same information. Most payment cards also require a specimen of the signature of the person on the back of the payment card. The wallet may also contain other items that contain personal data, such as sales receipts, telephone numbers of friends or other information.

If the wallet is lost, information of the person, including the name, address, driver license number, signature, payment card numbers and their expiration data may fall in the wrong hands and is subject to abuse such as misuse of the identity information, identity theft, fraudulent use of the payment cards and so on.

Alternately, when the person uses one of the payment cards for a payment transaction, the payment card is physically provided to the employee of the merchant to use the payment card to process a payment transaction and generate a paper transaction slip for the customer to sign. The paper transaction slip contains customer name, card number, expiration date and customer signature. If the customer copy of card transaction slip is carelessly discarded, it may fall in the wrong hand, raising the possibility of misuse of the data and identity theft.

Still alternately, when a person uses a check to make a payment to another, the check can disclose personal information of the person including the name, address, checking account number and the bank where the checking account is maintained.

Further, when a person pays a merchant for a purchase, via telephone, the person again must divulge to the employee of the merchant, their name, address and card number. Thus, the customer has to reveal personal information to the employee of the merchant in the course of the remote payment. Unfortunately, the employee of the merchant employee may be a dishonest person that misuses the information or an imposter.

There are many other ways where a person's personal information may be compromised. For example, the person can be careless in discarding transaction receipts and other personal data. Alternately, a sophisticated thief using guise and deception may be successful in stealing personal data information.

In light of the above, there is a need for an apparatus and method that enhances identity security and facilitates payment without providing information from payment cards, or other personal data. Further, there is a need for an apparatus and method for reducing the likelihood of theft of personal data and/or the misuse of personal data.

SUMMARY

The present invention is directed to an identity security system that includes a central system and a portable, mobile, wireless device. The central system stores and/or can readily access personal data of a party including information regarding one or more payment cards of the party, one or more bank accounts of the party, driver license data of the party, and/or other identification data of the party. The wireless device electronically communicates with the central system. With the present system, using the wireless device, the party can pay for a transaction using the one or more of the payment cards, cause funds to be transferred to or from the bank accounts and/or provide identifying data if necessary.

As a result thereof, the party can use the portable wireless device to function as an integrated identity and payment device or equivalently as a wallet. Thus, the party need not carry a wallet. Instead, the contents of a typical wallet, including a driver license, payment cards, and other personal data are readily accessible using the portable wireless device.

However, if portable wireless device is lost or stolen, the personal data, including the identification information, and the numbers of the payment cards is not accessible as they would be in a real physical wallet. Thus, the system provides a level of security to the party for their private data because the wireless device does not identify the owner by name, address, driver license and by payment card data.

As provided herein, the central system allows the party to open an integrated identity and payment device account and enables behind the scene facilitation of identity protection, personal data protection and integrated payment transactions. The central system stores private data of the person that is not recognizable and traceable to the person.

With the present system, a person can show an electronic version of their driver license for identification to a merchant, to a bank for identification for a banking transaction, to a peace officer for driver privileges, can pay a merchant in the merchant physical store, can pay a remote merchant by phone with anyone of his/her payment cards, and can also retrieve personal data.

The central system facilitates anonymous transactions globally between the customer and the merchant. The central system allows the customer to purchase one or more items or services from the merchant without the merchant knowing the identity, credit card information and/or location of the customer. Stated another way, the customer can purchase the goods and services from the merchant, without the merchant knowing the identity, physical address, electronic mail address, credit information and/or other personal information of the customer. This minimizes the likelihood of the improper dissemination of the personal information of the customer.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIGS. 3A-3F are block diagrams that illustrate databases having features of the present invention;

FIGS. 4A-4F are simplified illustrations of web pages that can be generated by the central system having features of the present invention;

FIGS. 6A and 6B illustrate merchant interfaces with the central system having features of the present invention;

FIG. 6C illustrates a pre-authorize merchant interface with the central system having features of the present invention;

FIG. 6D illustrates a merchant interface terminal device with the central system having features of the present invention;

FIG. 6E illustrates a human and scan readable merchant, store and register identification having features of the present invention;

DESCRIPTION

Introduction

Figure 1:
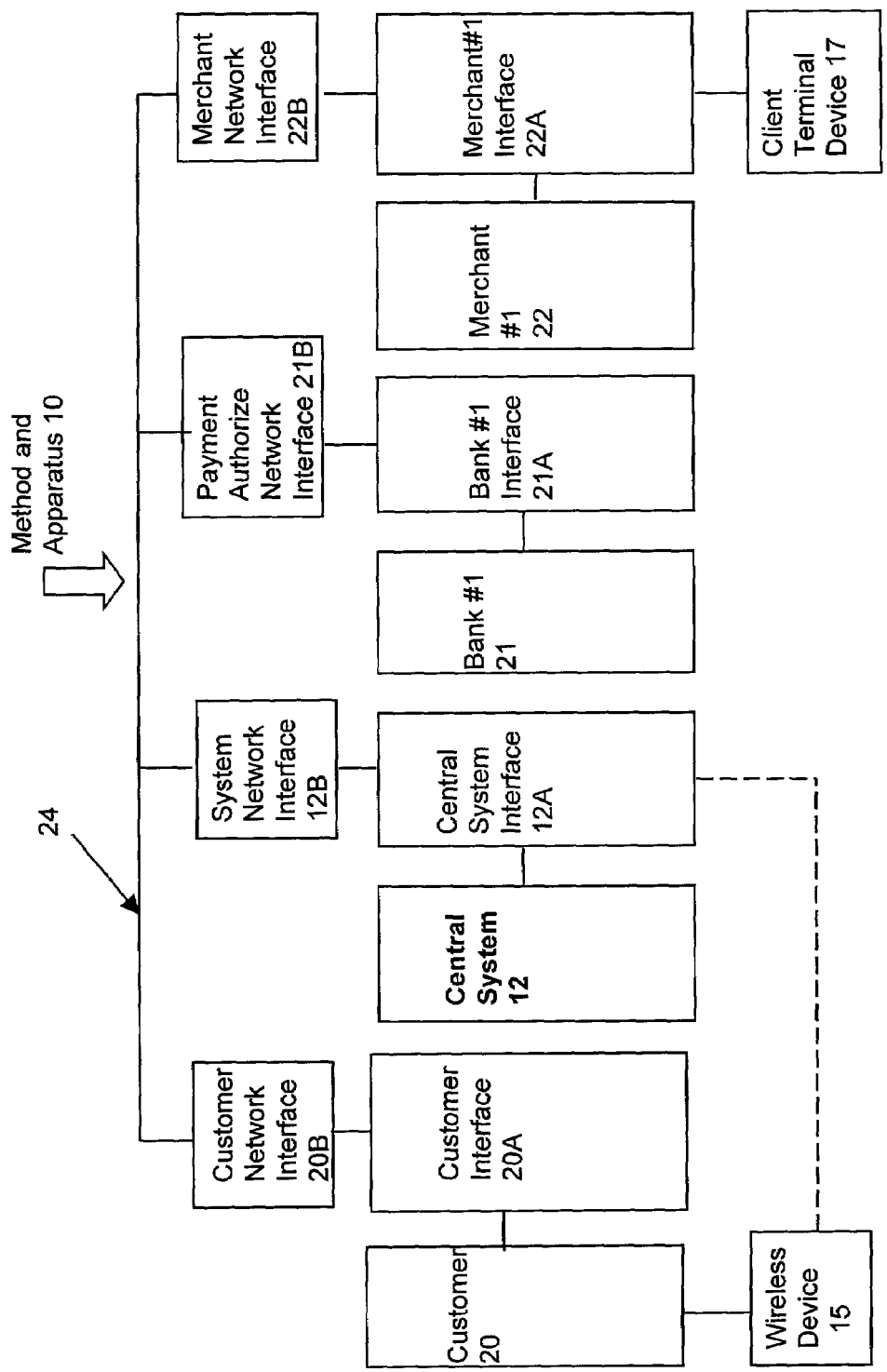
FIG. 1 is block diagram that illustrates an apparatus and method having features of the present invention.

Referring initially to FIG. 1, an integrated identity security and payment system 10 having features of the present invention can include a central system 12, a central system interface 12A, a customer interface 20A for a customer 20, at least one or more merchant interfaces 22A for a merchant 22 (one is illustrated), and one or more bank interfaces 21A (one is illustrated). The integrated identity and payment system 10 can be used in lieu of a physical wallet (not shown). The integrated identity and payment system 10 enables the customer 20 (i) to provide payment to the merchant 22 without revealing any personal data of the customer 20 to the merchant 22, (ii) to provide payment to other private parties without revealing any personal data of the customer 20 to the other private parties, (iii) function as an identity device to provide information contained on a driver license, without the risk of the drivers license being stolen or lost, and (iv) function as a data device for personal data while minimizing the likelihood of such data being lost or stolen.

As an overview, the present invention allows the customer 20 to maintain private data 25 (illustrated in FIG. 2A) in the central system 12 and to use a portable, mobile, wireless device 15 in place of his physical wallet. Preferred and optional aspects of the method and apparatus 10 are described below. The headings are provided for the convenience of the reader. Further, the present invention allows the customer 20 to purchase one or more items or services from the merchant 22 without the merchant 22 knowing the identity, credit card information and/or address of the customer 20. Stated another way, the system allows the customer 20 to purchase one or more items from the merchant 22 without disclosing the name, physical address, electronic mail address, and credit card information of the customer 20 to the merchant 22. As a result thereof, the system 12 minimizes the number of people, businesses and institutions that have access to the personal information of the customer 20. This minimizes the opportunity for the personal information of the customer 20 to be improperly disseminated.

Central System 12

Figure 2A:
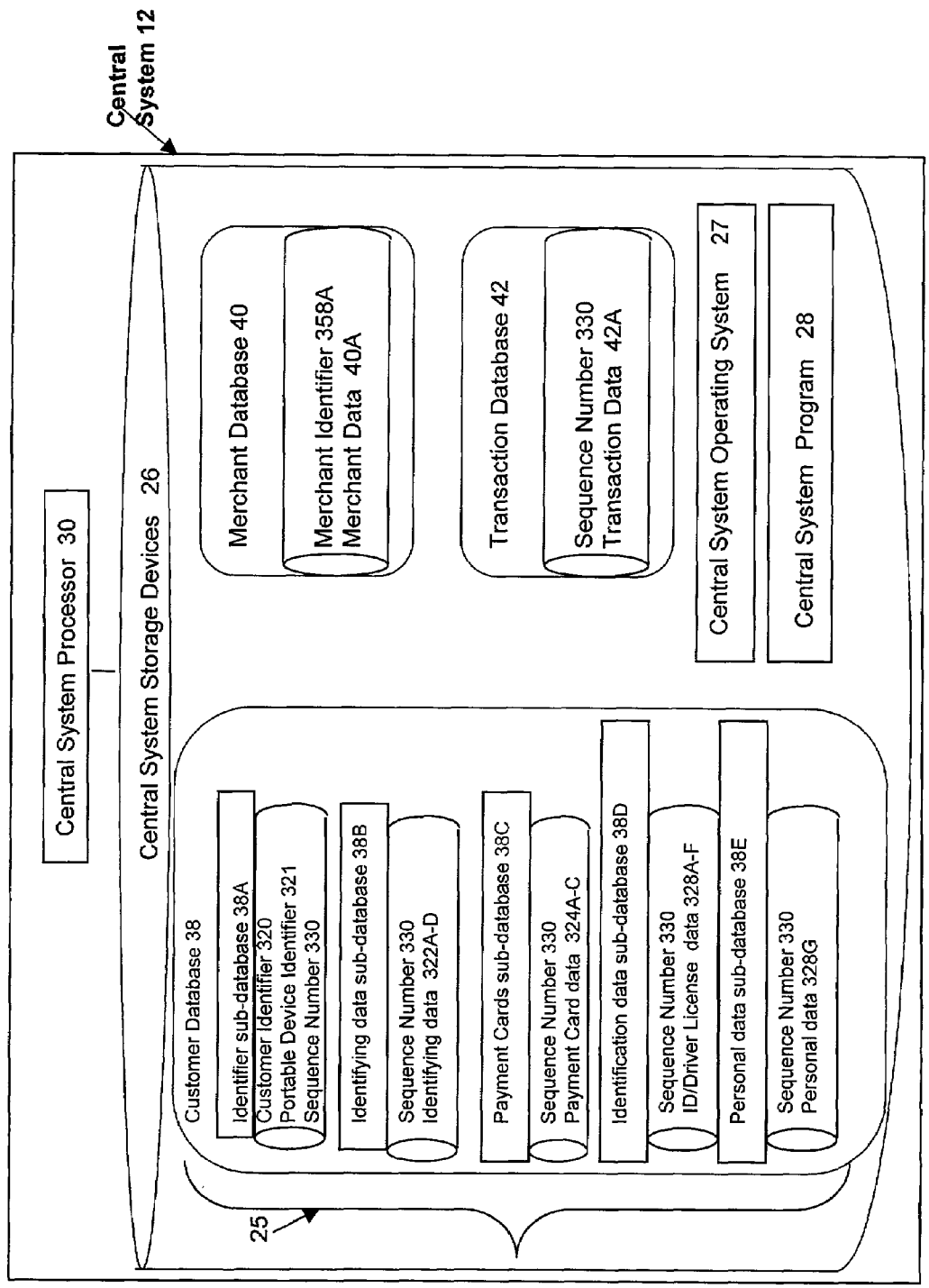
FIGS. 2A and 2B are block diagrams that illustrate a central system having features of the present invention.

Referring to FIG. 2A, the central system 12 includes (i) a central system storage device 26, (ii) a central system operating system 27 stored in the central system storage device 26, (iii) a central system program 28 stored in the central system storage device 26, (iv) and a central system processor 30 connected to the central system storage device 26.

The central system processor 30 can include one or more conventional CPU's. The central system processor 30 is preferably capable of high volume processing and database searches.

The central system storage device 26 can include one or more magnetic disk drives, magnetic tape drives, optical storage units, CD-ROM drives and/or flash memory. The central system storage device 26 can also contain a plurality of databases used in the processing of transactions pursuant to the present invention. For example, as illustrated in FIG. 2A, the central system storage device 26 can include a customer database 38, a merchant database 40, and a transaction database 42.

Referring back to FIG. 1, the central system 12 includes a system network interface 12B that allows the central system 12 to communicate with the customer 20, and the merchant 22. Conventional internal or external modems may serve as the system network interface 12B. In one embodiment, the system network interface 12B is connected to the merchant interface 22A, the customer interface 20A on the global network 24. Alternately, the system network interface 12B can be connected by an electronic, a voice and/or a traditional communication system that allows the central system 12 to interact with the merchant interface 22A, the customer interface 20A, and a payment authorize network interface 21B. For example, the central system 12 can be connected to the merchant interface 22A, the payment authorize network interface 21B, and the customer interface 20A with one or more land based and or wireless phone lines.

The central system interface 12A can include an input device (not shown), such as a keyboard, mouse or voice recognition software and a display that allows access to the central system 12. The central system 12 interfaces with the payment authorization network 21B. The network 21B is a prior art network and receives a payment transaction data and returns payment authorization data. The prior art network 21B for payment card transactions includes a merchant processor and a payment processor. The payment processor processes payment from the banks of the customer 20 and the merchant processor processes payments to the bank of the merchant. The prior art network 21B also includes a clearing house for clearing payment funds from the bank account of one party to the bank account of second party.

The customer network interface 20B allows the customer 20 to communicate with the central system 12. Conventional internal or external modems may serve as the customer network interface 20B. For example, the customer network interface 20B can be connected to the central system interface 12A on the global network 24. Alternately, the customer network interface 20B can be connected by other electronic, voice and/or traditional communication systems that allow the customer 20 to interact with the central system interface 12A.

The customer interface 20A can include an input device, such as a keyboard, mouse or voice recognition software and a display that allows the customer 20 to interact with the customer network interface 20B. For example, the customer interface 20A can include a personal computer (not shown) that can be used for opening and maintaining an account.

Further, the customer 20 can use the portable, wireless device 15 to communicate with the central system 12. The portable wireless device 15 can be a mobile phone, a personal digital assistant or another type of web-enabled portable device that can communicate with the central system 12.

The merchant network interface 22B allows the merchant 22 to communicate with the central system 12. Conventional internal or external modems may serve as the merchant network interface 22B. The merchant network interface 22B can be connected to the central system interface 12A on the global network 24. Alternately, the merchant network interface 22B can be connected by other electronic, voice and/or traditional communication systems that allow the merchant 22 to interact with the central system interface 12A.

The merchant system interface 22A can include an input device, such as a keyboard, mouse or voice recognition software and a display that allows access to the central system 12.

Further, the merchant interface 22A can also include a thin client terminal device 17 for receiving transaction related payment approval data.

The payment network interface 21B allows the central system 12 to communicate with the bank 21. The payment network 21B is used for collecting transaction funds from the customer bank and depositing the transaction funds to the merchant bank. The central system 12 may also act as a merchant processor in transferring funds to the merchant bank. Conventional internal or external modems may serve as the payment network interface 21B. The payment network interface 21B can be connected to the central system interface 12A on the global network 24. Alternately, the payment network interface 21B can be connected by other electronic, voice and/or traditional communication systems that allow the central system to interact with the bank interface 21A.

Further, the bank interface 21A can include an input device, such as a keyboard, mouse or voice recognition software and a display that allows access to the central system 12.

Central System Program 28

Figure 2B:
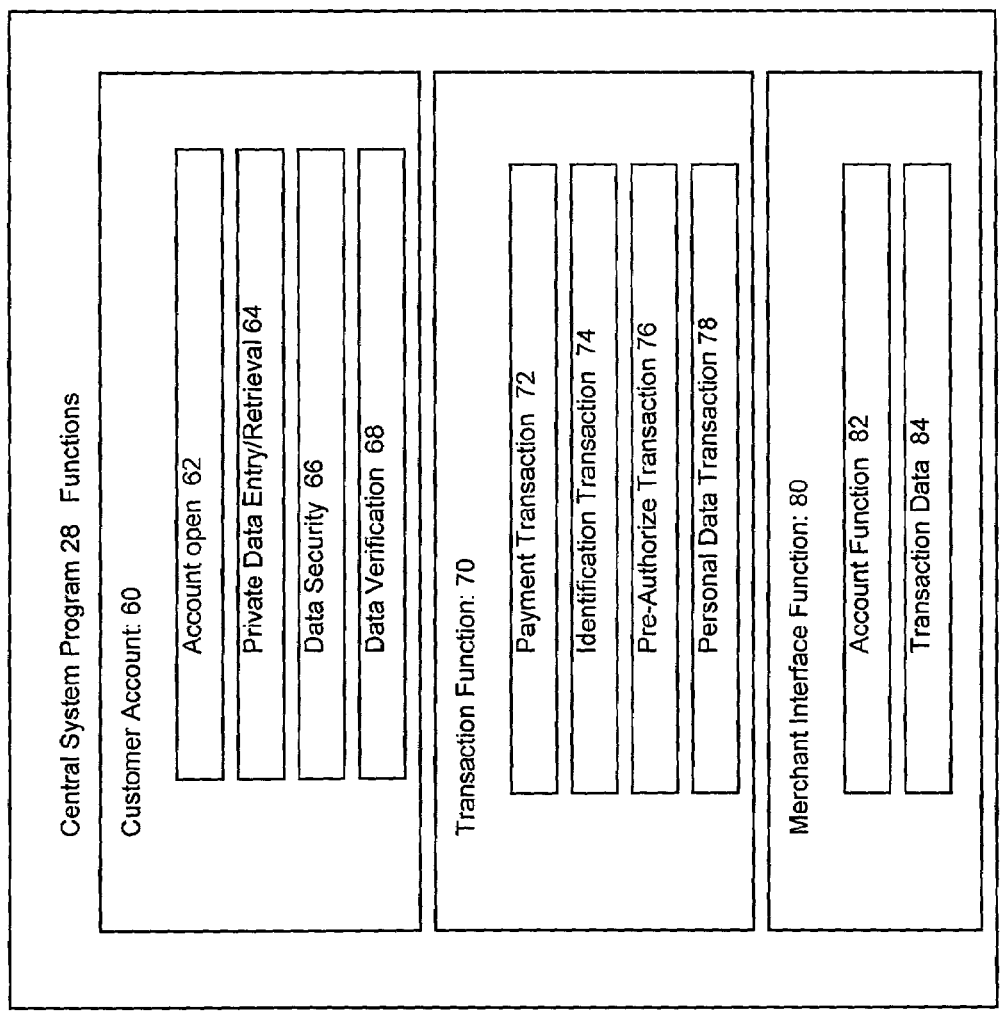

Referring to FIG. 2B, the central system program 28 is operative with the central system processor (not shown in FIG. 2B) to perform the functions of (i) opening and managing a customer accounts 60, (ii) conducting transactions 70 between the customer and the merchant, and (iii) interfacing with merchants 80.

The customer account function 60 enables the customer to open an account 62, (ii) enter and update customer private data 64, (iii) provide data security 66 and (iv) verify the accuracy of data 68. The customer private data 64 can include the customer name, address, driver license, email address, phone number, and information regarding payment cards.

Databases 38A-E (described later with reference to FIGS. 3A-E) and web pages 400 to 408 (described later with reference to FIGS. 4A-E) provide simplified illustrations of the functions of open account 62, enter and update personal data 64. The structure of the databases provides data security 66 by fragmenting the data into different data entities, so that the entirety of customer personal data does not reside in a singular database. The structure of databases 38A-E and web pages 400 to 408 are described later in this description.

The data verification 68 allows for the verification of some or all of the personal data of the customer so that, the customer cannot use false and or incorrect data for his/her identity data or use someone else's data as part of fraud or deception. Some of the personal identity data may be retrieved from other centralized databases for access or verification. As an example, a customer's driver license data, address, name, and credit card numbers may be verified by interfacing with private third parties and/or governmental entities.

Referring to FIG. 3D-1, the databases 38D store the private data of the customer including, the driver license number, the date-of birth for the customer, the customer identification and other data on a typically driver license, including date of expiration, driving restrictions, facial image, body features of, height, weight, color of hair and eyes and signature image that can be retrieved from a department of motor vehicles database.

The department of motor vehicles of almost all states, keep and maintain driver license data in computer databases. In order to open an account with the central system, the customer must consent to the retrieval of his/her driver license data from the appropriate governmental office, e.g. the department of motor vehicle records. For example, the driver license data can be retrieved once from the department of motor vehicles, at the time the customer opens an account and saved in the databases 38A-E in the central system. Further, the data can be automatically updated at the date of expiration of the driver license. Alternately, the driver license data may be retrieved each time the customer initiates a driver license data transaction.

The transaction processing function 70 enables integrated identity and payment device transactions. An integrated identity and payment device transaction may include (i) a payment for a transaction 72 to a merchant, (ii) a driver license/identity verification transaction 74, (iii) a pre-authorize transaction 74, and/or (iv) a personal data retrieval transaction 78.

A payment transaction 72 has the sub-functions of (a) the wireless device interfacing with the central system to send payment specific access code and payment transaction data from the customer 20, (b) assembling the payment transaction data with the central system by searching databases 38A-D to assemble a payment transaction data record (c) card network interface to interface with payment networks 21B to send the payment transaction data record and to receive payment authorization number, (d) to post the completed transaction record data to the merchant interface 22A, and customer interface 20A and (d) to save the completed transaction data for later retrieval subsequent to a transaction for accounting purposes.

A driver license or identification transaction 74 has the sub-functions of (a) the wireless device interfacing with the central system to send driver license specific access code for identification, (b) process to identify and verify and by searching databases 38A-D to assemble driver license data record, and (c) to send the driver license data record to customer.

A pre-authorize payment transaction 76 has the sub-functions of (a) the wireless device interfacing with the central system to send payment specific access code and payment transaction data from the customer 20, (b) payment process to process payment transaction data by searching databases 38A-D to assemble a pre-authorize payment transaction data record, (c) card network Interface to interface with card networks 21B to send the payment preauthorize transaction data record and to receive pre-payment authorization number, and (d) to post the pre-authorize transaction record date to the merchant interface 22A, and customer interface 20A.

A personal data transaction 78 has the sub-functions of (a) using the wireless device to interface with the central system to send access code for personal data (b) process to identify and verify and by searching databases 38A-D to assemble personal data record (c) to send the personal data record to the customer on the wireless device.

The merchant interface function 80 enables interface with the merchant. It may include an account function 82 and transaction data function 84. The account function 82 enables a merchant to establish an account at the central system 12 that enables the payment transaction to be processed for the merchant 22. This function is described later with reference to FIG. 6A. The transaction data function 84 enables the merchant 22 to receive the payment transaction approval data in real time. This function is described later with reference to FIGS. 6B, 6C, 6D and 6E.

For a payment transaction between two private parties, the funds are transferred from one party's bank account to the other party's bank account using a prior art Automated Clearing House (ACH).

For a payment transaction between a customer and a merchant, the funds from the transaction are directed to the merchant bank account 358G.

Customer Database 38

With reference to FIG. 2A, the customer database 38 contains private data 25 specifically related to the customer 20. The private data 25 related to the customer 20 is preferably separated and stored in separate sub-databases, namely, (i) an identifier sub-database 38A, (ii) identifying data sub-database 38B, (iii) payment card data sub-database 38C, (iv) Identification/Driver License data base 38D and (v) personal data sub-database 38E of each customer 20. Each sub-database is explained below.

Identifier Database 38A

Referring to FIGS. 2A and 3A, the central system 12 can store the customer identifier 320 of each of the customers 20 in the identifier database 38A. As provided herein, the customer identifier 320 can be used to identify and verify the customer 20 for gaining access to and interacting with the central system 12. The customer identifier 320 enables the customer 20 to interact with and use the central system 12 without revealing their personal identity. Stated another way, the customer identifier 320 enables the customer 20 to be identified to the central system 12.

The customer identifier 320 can be any number of characters that can be used to identify and verify the customer 20 for gaining access to and interacting with the central system 12. The customer identifier 320 can be self-created by the user 20 for ease of remembering the customer identifier 320. For example, the user 20 can decide upon the exact characters that make up the customer identifier 320. However, as provided herein, the central system 12 can provide a guideline for the format of the customer identifier 320.

The portable device identifier 321 may be the telephone number or a telephone number based number if the web-enabled device is a telephone, or a web-enabled personal digital assistant's identifying machine code that can verify the source of the transaction when the wireless device connects to the central system 12. The telephone number of the wireless device is identified as the caller identification at the central system and is used to verify the wireless device.

The central system 12 can assign and associate a unique sequence number 330 for each customer identifier 320. The sequence number 330 can include any number of characters. The sequence number 330 is subsequently used as a reference to save and retrieve the private data 25 of the customer 20 in the identifying database 38B, the card data database 38C, the Identification/Driver License database 38D and the personal data database 38E. The sequence number 330 is also stored with the customer identifier 320 in the identifier database 38A.

Upon the entry of the customer identifier 320 by the customer 20 via the customer interface 20A, the central system program 28 operates with the central system processor 30 to review the identifier database 38A to check for the existence of the customer identifier 320. Upon the location of an existing customer identifier 320, the central system 12 allows the customer 20 to have access to the private data 25 that is tied to the customer identifier 320. The identifier database 38A is also used to store the new customer identifier 320 for each new customer 20 that creates a new customer identifier 320.

Identifying Database 38B

Referring to FIG. 3B, the central system 12 can store any identifying data 322 of the customer 20 in the identifying database 38B of the storage device 26. Examples of identifying data 322 include, a name 350A, a street address 350B, and city, state 350C of the customer 20. Identifying data 322 can also include the email address, social security number or other data that specifically identifies the customer 20.

Card Data Database 38C

Figure 3C:
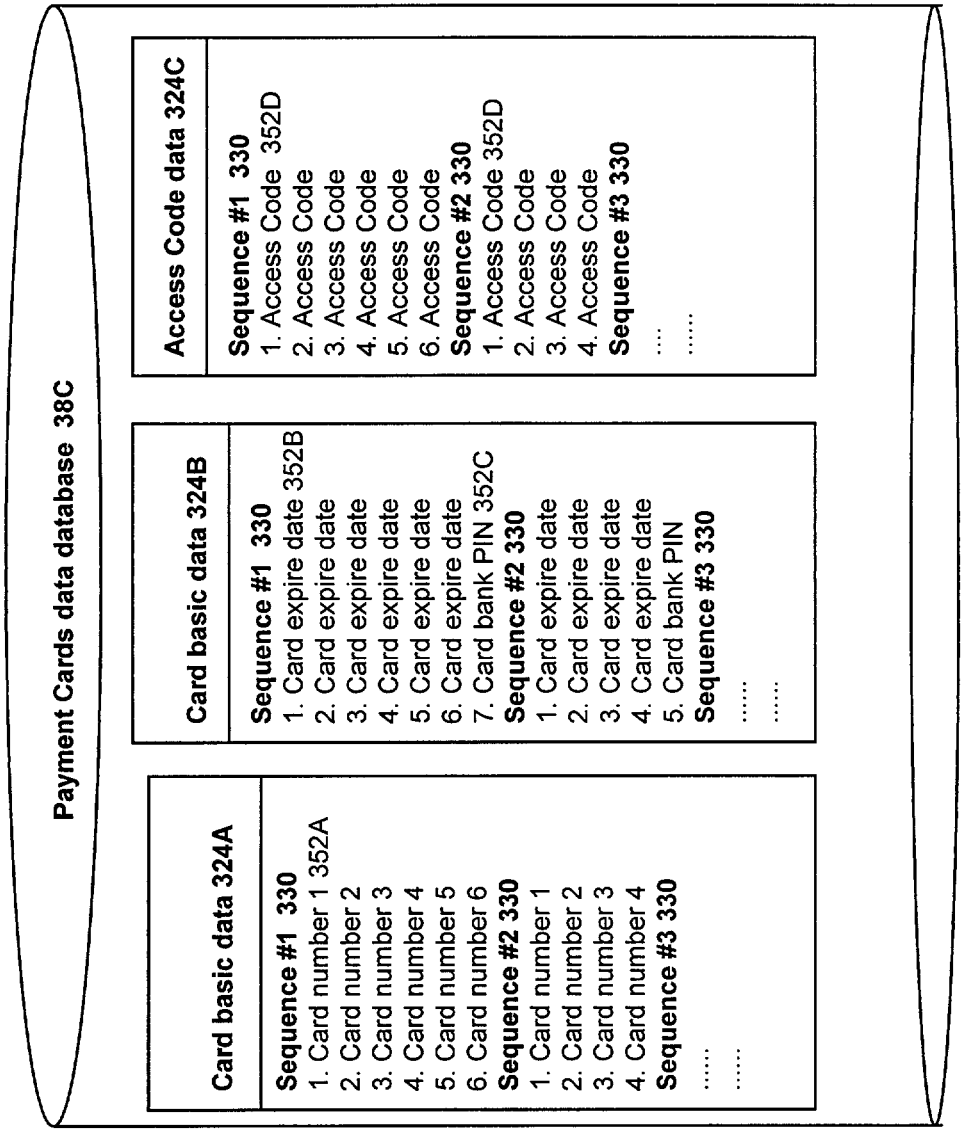

With reference to FIGS. 3A-3C, the data relating to the payment cards of the customer 20 can be stored as data parts in multiple databases. Examples of payment cards include charge cards, debit cards, check cards, and merchant cards specific to a merchant. As a simplified illustration, for payment card 1, the customer name is stored as data 322A in database 38B and the card number and card expiration as data 324A and 324B in database 38C. Multiple payment cards of the customer can be stored and anchored by the sequence number 330. For each card of the customer, the database 324B may also store its corresponding expiration date 352B and for those cards for which a PIN is used, the PIN 352C of the cards.

The database 324C may store access codes 352D for each card in database 324A, that have been self-selected by the customer 20. The access codes are also anchored by the sequence number 330. The access codes 352D can be used to identify which one of the multiple payment cards the customer intends to use for a specific transaction.

Driver License/Identification Data Database 38D

With reference to FIGS. 2A and 3D-1, the driver license data of the customer may be stored in the central system. As an illustration, the driver license specific access code 354G, license number 354A, expiration date 354B, date of birth 354C, height 354C-1, weight 354C-2, color of hair 354C-3, facial image 354D, signature image 354E and driving restrictions 354F are saved in database 38D. The driver license data can include an electronic image of the driver license of the driver and/or an electronic image of the fingerprint of the driver. Further, an electronic image of the social security card of the person can be stored in the database.

An authentication code 354G may also be stored in database 38D, The authentication code is a reliability indicia that verifies the authenticity of the data record. It can be an encryption code, check sum code or another code that may embed date and time, when the data was retrieved from the government records. The code may be numerical or a graphical bar or dot code. The code or a part of the code may be present in the government or DMV system. This code may be used by an inspection officer to verify that the data record is correct, genuine, accurate and/or timely from the government records.

Personal Data Database 38E

With reference to FIGS. 2A and 3D-2, the customer personal data may also be stored in the central system. As a simplified illustration, personal data specific access code 356A and personal data 356B are saved in database 38E. If customer desires, the instances of multiple types of personal data may be identified by specific access codes, enabling more than one personal data entry to be kept and retrieved by its specific access code.

Examples of personal data are telephone numbers and personal notes or any other data that a customer is likely to keep in his/her wallet and or personal diary.

Merchant Data database 40

With reference to FIGS. 2A and 3E, the merchant database 40 maintains data 42A on all of the merchants 22 that interact with the central system 12. The merchant database 40 can store (i) a merchant identifier 358A and (ii) the merchant date 40A, e.g. the name, address, phone, facsimile, web page, and/or electronic mail address of the merchant together in one sub-database. A merchant 22 may connect to central system 12 and enter/update merchant data.

Some of the data outlined above is optional and does not need to be stored in the central system 12. For example, the merchant database 40 can store only the merchant identifier 358A, the merchant name 358B and the corresponding web-access data 358C for the delivery of a completed payment transaction record to the merchant. Additionally, the merchant database 40 can store the Uniform Resource Locator or Uniform Resource Indicator reference 358C of the merchant computer system where the results of the payment transaction are transferred. If a merchant has multiple stores, each store would have a URL reference 358C to be able to transfer the results of a payment transaction to that particular store. If a merchant has multiple cash registers within a store, each register would have a URL reference 358D to be able to transfer the results of a payment transaction to that particular cash register.

The data 40A may also include merchant bank account number 358E. The bank account number 358E may be used to transfer or redirect customer payment funds via the payment processor to the merchant bank.

Transaction Database 42

With reference to FIGS. 2A, 3F and 4F, a transaction database 42 maintains data relating to the transaction 42A. The transaction data 42A can include details of a payment transaction such as a transaction reference number 360A, a merchant id 358A, a store Id 358C, and optionally, a cash register Id 358D, a date of transaction 360B, a time of transaction 360C, a card agency issued authorization number 360D, and a dollar amount 360E. This transaction data may be retrieved by the customer for review via web page 410 for accounting and record keeping purposes, as illustrated in FIG. 4F. In addition, it may also be retrieved by the merchant 22 for accounting and/or record keeping purposes.

Central System Web Pages 400-410

As provided herein, the central system program 28 is operative with the central system processor 30 to generate one or more web pages on the world wide web. The web pages allow each customer 20 to provide information through the customer interface 20A to the central system 12. Alternately, for example, instead of the world wide web, the customer 20 can provide some or all of the information to the central system 12 verbally, or via email, facsimile, or postal mail transmissions.

Figure 4A:
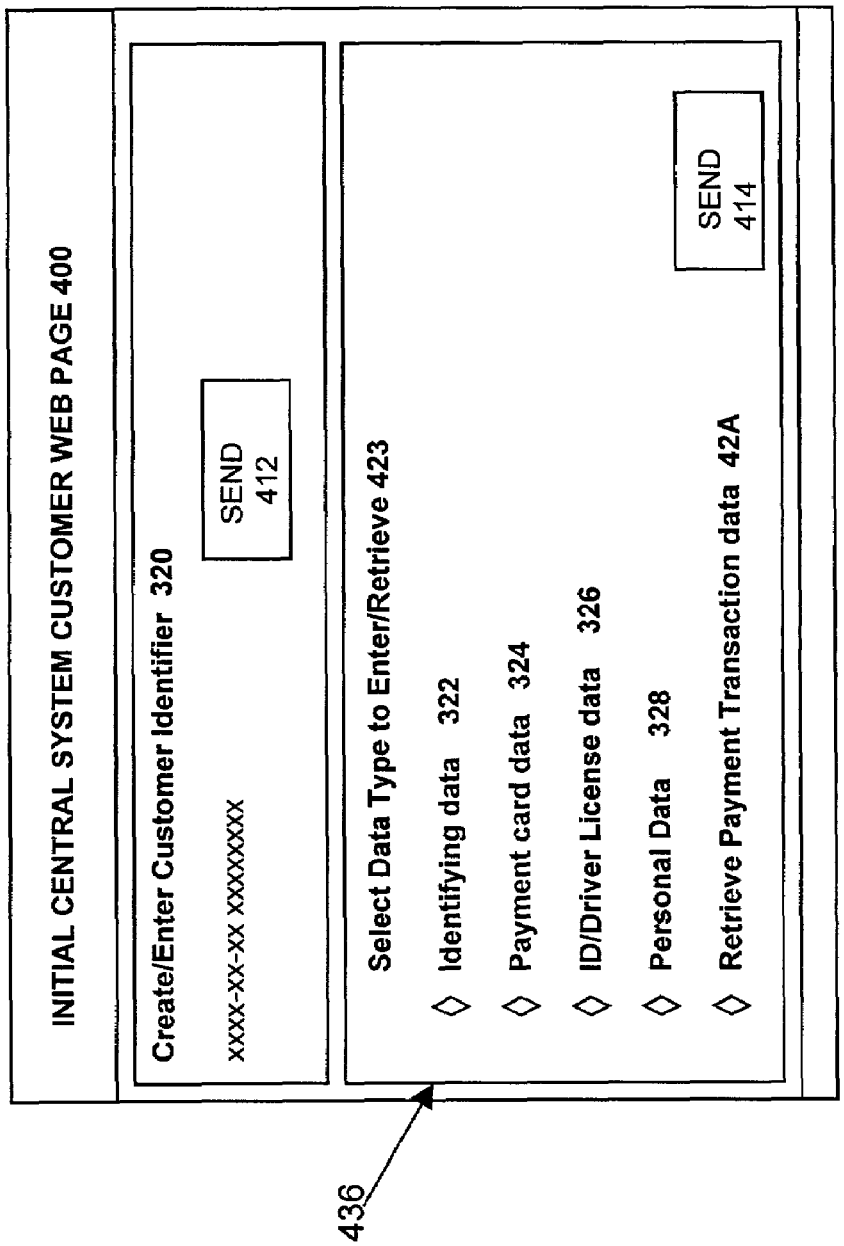

FIG. 4A illustrates an initial system web page 400 having features of the present invention. The initial system web page 400 can be displayed on the customer interface 20A when the customer 20 connects to the central system 12. The initial system web page 400 includes an area for entry of a customer identifier 320, and a SEND icon 412.

After the customer 20 enters the required information and clicks the SEND icon 412, the central system 12 receives and validates the customer identifier 320. Subsequently, the central system 12 generates a data type page 436 that allows the customer 20 to select data type to enter/retrieve 423. The data types can include identifying data 322, payment card data 324, ID/driver license data 326, personal data 328 and retrieval of transaction data 42A.

After selection of a data type and clicking SEND icon 414, the web page 402-408 with the corresponding data type forms 424A, 424B, 424C and 424D is displayed.

With reference to FIG. 4B, form 424A on web page 402 allows entry of identifying data 322 such as name 350A, street address 350B, and city/state/zip 350C into the central system.

With reference to FIG. 4C, form 424B on web page 404 allows entry of payment card data 324 such as payment card number 352A, payment card expiration date 352B, and a PIN 352C for those payment cards that require a PIN. Access codes 352D are entered for each of the customer's existing payment card numbers 352A. This enables the customer to select any one of the existing cards when conducting a payment transaction. The access codes 352D may be simple numeric sequences such as 1011 for card 1, 1012 for card 2 and so on.

With reference to FIG. 4D, form 424C on web page 406 allows entry of ID/driver license data 326. The customer may enter only some basic data such as license number 354A, date of birth 354B and access code 354G. The remainder of license data of name 350A, street address 350B, city/State 350C, expiration date 354B, height 354C-1, weight 354C-2, color of hair 354C-3, facial image 354D, signature image 354E and driving restrictions 354F may be retrieved from the department of motor vehicles records. The customer provides express permission via checking option 424C-1 on the data form 424C for the central system to retrieve the data from the department of motor vehicles. The central system may retrieve the license data as a database record for entry into the database, and then display the license data to the customer without the ability of the customer to change the license data. Alternatively a paper record may be retrieved and then entered into the database 38D-1. Once the license data is retrieved, the customer can review the data to ensure that the correct license data is contained in the central system database 38D-1.

With reference to FIG. 4E, form 424D on web page 408 allows entry of personal data 328 entered by the customer. This personal data has the data specific access code 356A and the personal data 356B. Multiple data with different access codes may be kept allowing only a specific data to be retrieved.

With reference to FIG. 4F, web page 410 allows retrieval/review of the payment transaction data 42A. Transaction data 42A for each transaction is displayed by each merchant 358A, store id 358B, transaction date 360B, transaction time 360C, transaction reference number 360A, authorization number 360D and dollar amount 360E. These are the same or similar items that are contained in a physical transaction receipt received from a merchant in a store at the completion of the payment transaction.

Customer Transaction Interface 20A

Figures 5A, 5B:
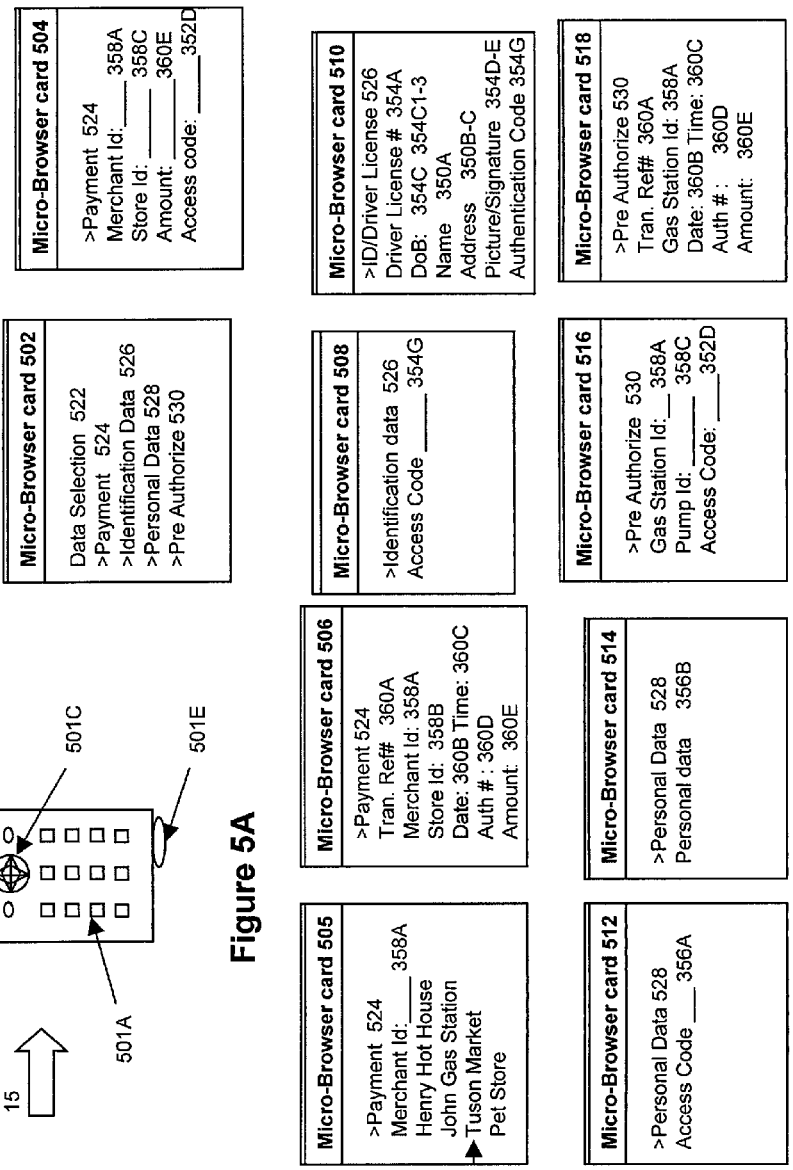
FIG. 5A illustrates a wireless device having features of the present invention.
FIG. 5B illustrates a plurality of micro-browser data-cards for the wireless device.

With reference to FIG. 5A, a customer conducts an integrated identity and payment transaction with a transaction interface, e.g. the wireless device 15. For example, the wireless device 15 can be a web-enabled cellular telephone, a web-enabled portable digital assistant device with built in modem or another type of web-enabled portable device that is adapted to perform the functions provided herein.

When activated, the wireless device 15 connects to the central system, as would a web-enabled cellular telephone with a computer system using Uniform Resource Index (URI) for web access using a micro-browser, data card, Wide Area Protocol (WAP) and WAP mark up Language (WML) standards and technologies. These standards and technologies are adaptation of the Internet related technologies of Hyper Text Markup Language (HTML), Hypertext Transport Protocol (HTTP), web page and browser to the requirements of portable wireless devices and are prior art. Their description may be found in documents available at www.wapforum.org.

The wireless device 15 can include a display screen 501B, a keypad 501A, a mouse function 501C for selection of a choice and to scroll a list of choices from a menu list 501D. The wireless device 15 may also have a reader element 501E. The reader element 501E may be used to scan/read an input data such as merchant id 358A, store id 358B, without the customer having to manually enter the data using the keypad 501A. The reader element 501E may use optical character recognition, bar code recognition, magnetic code recognition or any other technology suitable for reading a merchant and store Id code and is compact enough to be installed and integrated into the wireless device 15.

Using the wireless device 15, the customer selects a wallet menu choice 501D, which enables a web link to the central system 12. The web-link transmits the telephone number and/or the device id of the wireless device 15, providing an identification of the customer to the central system.

With reference to FIG. 5B, the central system 12 (not shown in FIG. 5B) sends a micro-browser card 502 for display on the device 15, which allows for a selection of a data transaction 522 of payment 524, license 526, personal data 528 and pre-authorize 530. Using the wireless device 15, the customer selects one of these data selection choices. The central system 12 then sends one of the micro-browser cards 504, 508, 512 or 516 to the device 15, depending upon the selection. Micro-browser cards 504 and 506 are used for a payment transaction from the customer to the merchant. Micro-browser cards 508 and 510 enable the customer to provide information from their ID/Driver license. Micro-browser cards 512 and 514 enable the customer to access and/or modify personal data. Micro-browser cards 516 and 518 enable the customer to be pre-authorized for a transaction with the merchant.

With reference to micro-browser cards 504, 505 and 506, micro-browser card 504 provides the merchant id 358A, the store id 358B, the amount 360E and the card specific access code 352D. Micro-browser card 505 is optional and provides a list of merchants with which the customer 20 has conducted prior transactions so that the customer can select a merchant without having to enter a merchant id 358A. Micro-browser card 506 provides some of the same data as on micro-browser card 504 and additional data of transaction date 360B, time of transaction 360C, transaction reference number 360A and authorization number 360D.

On micro-browser card 502, the customer enters using keypad 501A on the wireless device or scans in using reader element 501E on the wireless device, the merchant id, the store id, and enters the amount and access code and activates Payment to send this data to the central system. The merchant id 358A can be entered by keying in the information 358A, 358C and 358D, scanning in the bar code as explained later with reference to FIG. 6E, or selecting from an existing list of merchants with whom the customer has conducted prior transactions. The existing list of merchants can be searched and retrieved from the transaction database 42 and displayed to the customer on Micro-browser card 505. The activate payment may be one of the keypad keys such as #, * or it may be a special function key. The central system accesses the customer data, and prepares a payment transaction data record and submits it for processing to the payment network 21B and received a payment authority record which is then transmitted to the wireless device 15 and is displayed as micro-browser card 506.

With reference to micro-browser cards 508 and 510, micro-browser card 508 provides the license 526 and specific access code 354G. On micro-browser card 508, the customer enters the access code and activates the license to send this data to the central system. The central system accesses the customer data, and prepares a license data record which is transmitted to the device 15 and is displayed on the micro-browser card 510 with the license number 354A, the date of birth 354C, the name 350A, the address 350B-C, the picture/signature image 354D-E and body data of mark, height, weight and hair color 354C1-C3. As provided herein, an electronic image of the driver license and/or the social security card of the person can be transmitted to and displayed on the wireless device.

With reference to micro-browser cards 512 and 514, the micro-browser card 512 provides personal data 528 and the specific access code 356A. On micro-browser card 512, the customer enters the specific access code 356A and activates the personal data to send this data to the central system. The central system accesses the customer personal data, and prepares a data record that is then transmitted to the device 15 and displayed on micro-browser card 514 with data 356B.

Micro-browser cards 516 and 518 are used for the payment transactions that require a pre-authorization as a first step for the service to begin and a final payment authorization when the service is completed. Examples of pre-authorization are pumping gas, paying at a vending machine, paying at a hotel room or paying for a car rental.

Micro-browser card 516 provides the merchant id 358A, the pump/vending machine id 358B and the card specific access code 352D. On micro-browser card 516, the customer, using the keypad or scans in using reader element 501E, the merchant id, the vending machine id, and enters the access code and activates payment to send this data to the central system. The central system (i) accesses the customer data, (ii) prepares a payment transaction data record, (iii) submits the payment transaction data record to the card network for processing, and, (iv) receives a payment authority record which is displayed on micro-browser card 518. Micro-browser card 518 provides some of the same data as on micro-browser card 516 and the additional data of date 360B, time 360C, transaction reference number 360A, authorize number 360D, and the amount 360E.

Merchant Interface

The merchant 22 is notified by the central system 12 of a successful completion of a payment transaction by being delivered a payment authorization data record in real time over the global computer network 24, as soon as the transaction is approved by the bank 21 via the payment network 21B. The payment authorization record can be transmitted to the merchant 22 via the global computer network 24 in ways called pull method or push method. In the pull method, the merchant 22 is connected to the central system 12 by being logged on by merchant id and store id and pulls the transaction payment record from the transaction database 42 of the central system 12. In the push method, the merchant 22 is not connected to the central system 12, but the central system 12 using the pre-stored URL for the merchant 22 and its particular store pushes the transaction payment record to the merchant address identified by the URL. The merchant can select either the push method or the pull of receiving payment authorization data.

With reference to FIG. 6A, the merchant connects to the central system 12 and enters the merchant id 358A and is then allowed to make a pull option 572 selection or push option 576 selection. If the pull option is selected, the merchant enters the user id 574 by which the merchant is identified to the system when the merchant connects to pull the transaction payment record. If the merchant selects the push option 576, the merchant is asked to provide a list of store URLs, which the merchant can provide by the store Id and its corresponding URL 358C and its corresponding cash register URL 358D.

With reference to FIG. 6B, with the pull method, the merchant is logged in to the central system with the merchant id 358A, the store id 358C, and the cash register id 358D being displayed on web page 520. The web page identifies the payment transaction records. This data is constantly being pulled and refreshed from the central system, with current data being displayed and old data scrolling off the screen. The most recent transaction 570 can be displayed by highlighting the most recent transaction 570 in color or in a box.

The push method (not shown) is to have merchant URL in the central system and central system pushing the payment record to that URL. The payment data record may be delivered or retrieved in other ways also such as telephonically, or fax.

FIG. 6C illustrates how a pre-authorize transaction may be handled. A pre-authorize transaction is suitable for a vending machine format such as automated gas station for pumping gas. FIG. 6C illustrates a gas pump 562, a gas pump control unit 560, a gas station and pump id machine readable tag 568 on the gas pump, the merchant computer system 22A, the device 15 and central system 12.

The customer activates pre-authorize option 530 on the micro-browser page 502 on device 15, displaying micro-browser page 516. The customer then scans using scan element 501E into the wireless device the gas station/pump id tag 568, and activates pre-authorize by entering the customer access code 352D. The wireless device 15 links to the central system 12, which conducts a pre-authorize transaction with the payment network 21B, and sends the authorize record to the merchant system 22A. The merchant system 22A sends an enable command 564 to the particular pump to the pump control unit 560, enabling the pump to be initialized and activated for the customer to start filling the vehicle. At the completion of filling, the control unit 560 sends a dollar amount 566 to the merchant system 22A, which in turn sends the dollar amount to the central system. The central system then completes the dollar amount of the transaction and runs a card payment transaction.

FIG. 6D illustrates a merchant transaction terminal 592. Two terminals 592A and 592B are shows as an illustration for different cash registers. Each terminal is connected to the World Wide Web 590. A most recent transaction is highlighted as 570. These terminals 592 may be thin clients with the limited hardware and software necessary to receive only the pushed transaction data and displaying it to the check out counter person.

FIG. 6E illustrates a human and scan readable format 568 merchant id. It may consist of bar code 594, a human and/or optical character readable number 596. This format 568 of the merchant identification includes the merchant id 358A, the store Id 358C and the cash register Id 358D.

The format 568 may be an applique or sign affixed near a cash register for easy access by a customer 20 to scan the sign and read it with the wireless device 15.

Operation

The operation of the apparatus 10 and the central system 12 is further explained with reference to the flow charts illustrated in FIGS. 7A-7C. It should be noted that the order of some or all of the steps provided below can be varied. Further, not all of the steps outlined below are necessary to perform a transaction pursuant to the present invention.

Figure 7A:
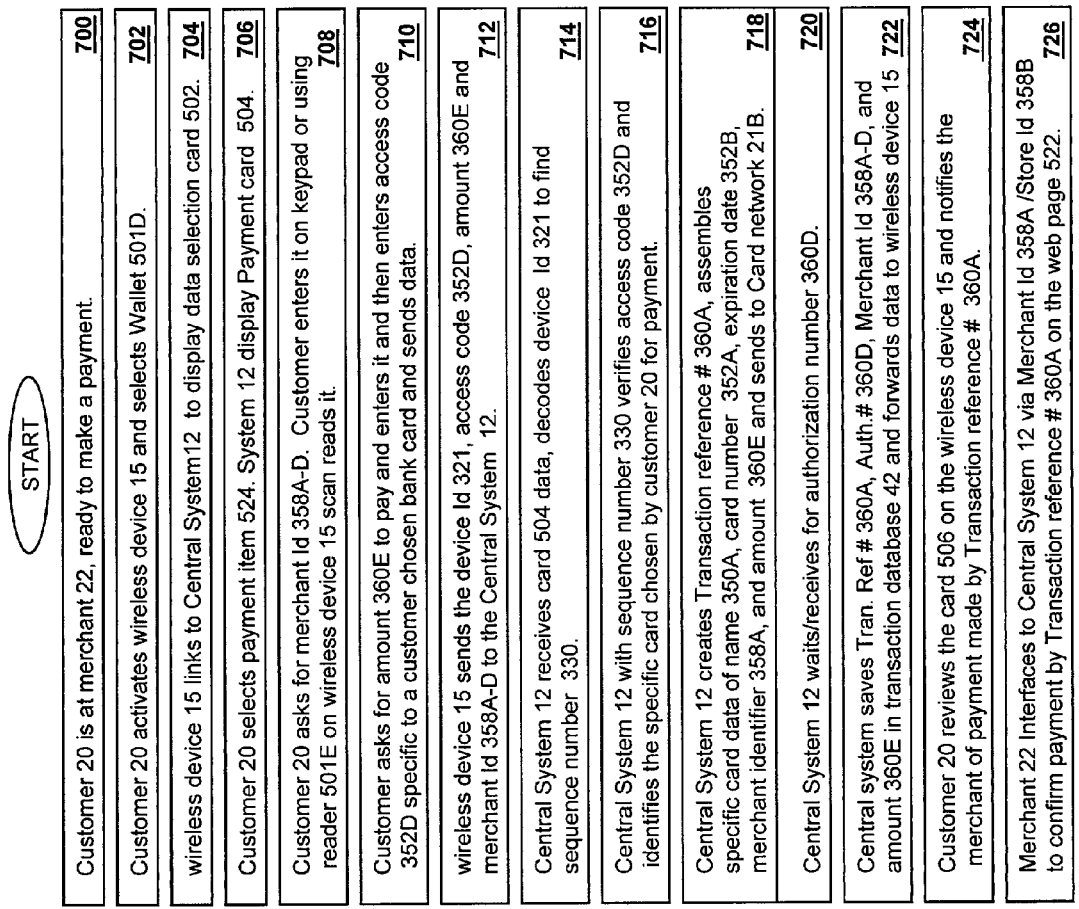
FIGS. 7A and 7B are block diagrams that outline the identity security system.

In particular, the operation of the central system 12 in processing a payment transaction is outlined in FIG. 7A. At step 700, the Customer 20 is at the merchant 22, ready to make a payment for a transaction. The transaction can be for goods or services from the merchant 22. At step 702, the Customer 20 activates the wireless device 15 and selects Wallet 501D. At step 704, the wireless device 15 links to the central system 12 to display data selection micro browser card 502. At step 706, the customer 20 selects the payment option 524. At step 708, the customer 20 asks for merchant Id 358A-D. The customer enters the merchant Id 358A-D on the keypad on the wireless device 15. Alternatively, using the reader 501E on the wireless device 15 can be used to scan read the sign 568. At step 710, the customer asks, for the amount 360E to pay, from the merchant, enters the amount in the wireless device 15, and then enters an access code 352D specific to a customer chosen payment card and sends the data. At step 712, the wireless device sends the device Id 321, the access code 352D, the amount 360E and the merchant Id 358A-D to the central system 12. At step 714, the central system 12 receives the data from micro-browser card 504, decodes the device Id 321 to find the sequence number 330. At step 716, the central system 12 with sequence number 330 verifies the access code 352D and identifies the specific payment card chosen by customer 20 for payment. At step 718, the central system 12 creates the transaction reference #360A, assembles specific payment card data of name 350A, the card number 352A, the expiration date 352B, the merchant identifier 358A, and the amount 360E and sends this information to the to the payment authorization network 21B. At step 720, the central system 12 waits/receives the authorization number 360D. At step 722, the central system 12 saves the transaction ref #360A, an authorization #360D, a merchant Id 358A-D, and the amount 360E in transaction database 42 and forwards the data to the wireless device 15. At step 724, the customer 20 reviews the micro-browser card 506 on the wireless phone and notifies the merchant of payment made by transaction reference #360A. At step 726, the merchant 22 interfaces to the central system 12 via the merchant Id 358A/Store Id 358B to confirm payment by transaction reference #360A on the web page 522.

The payment amount 360E is transferred by the merchant processor to the merchant bank account. Alternatively, the central system 12 using merchant bank account 358E can also transfer payment funds to the merchant.

It should be noted that the central system facilitates anonymous transactions globally between the customer and the merchant. The central system allows the customer to purchase one or more items or services from the merchant without the merchant knowing the identity, credit card information and/or location of the customer. Stated another way, the customer can purchase the goods and services from the merchant, without the merchant knowing the identity, physical address, electronic mail address, credit information and/or other personal information of the customer. This minimizes the likelihood of the improper dissemination of the personal information of the customer. Further, if the portable wireless device is lost or stolen, the personal data, including the identification information, and the numbers of the payment cards is not accessible as they would be in a real physical wallet. Thus, the system provides a level of security to the party for their private data because the wireless device does not identify the owner by name, address, driver license and by payment card data.

Figure 7B:
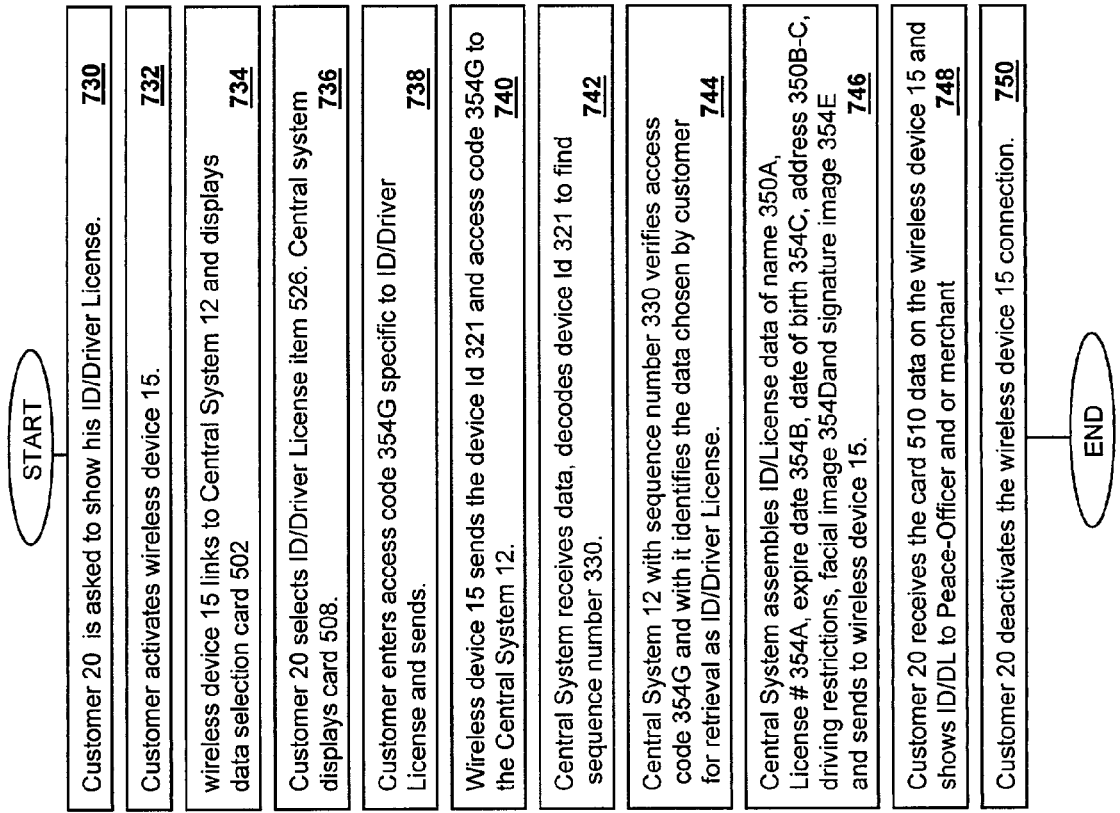

The operation of the central system in processing an identification transaction is outlined in FIG. 7B. At step 730, the customer 20 is asked to show his ID/Driver License. At step 732, the customer activates the wireless device 15. At step 734, the wireless device links to the central system 12 and displays data selection card 502. At step 736, the customer 20 selects the ID/Driver License item 526. The central system displays card 508. At step 738, the customer enters the access code 354G specific to ID/Driver License and sends. At step 740, the wireless device 15 sends the device Id 321 and the access code 354G to the central system 12. At step 742, the central system receives the data, decodes the device Id 321 to find the sequence number 330. At step 744, the central system 12, with sequence number 330 verifies the access code 354G and with it identifies the data chosen by customer for retrieval as ID/Driver License. At step 746, the central system assembles the ID/License data of name 350A, License #354A, expire date 354B, date of birth 354C, address 350B-C, driving restrictions, facial image 354D, fingerprint and signature image 354E and sends to the wireless device 15. At step 748, the customer 20 receives the card 510 data on the wireless device 15 and shows the ID to the Peace-Officer and/or merchant. At step 750, the customer 20 deactivates the wireless device 15.

Thus, with the present system, a person can show an electronic version of their driver license for identification to a merchant, to a bank for identification for a banking transaction, to a peace officer for driver privileges, can pay a merchant in the merchant physical store, can pay a remote merchant by phone with anyone of his/her payment cards, and can also retrieve personal data.

Figure 7C:
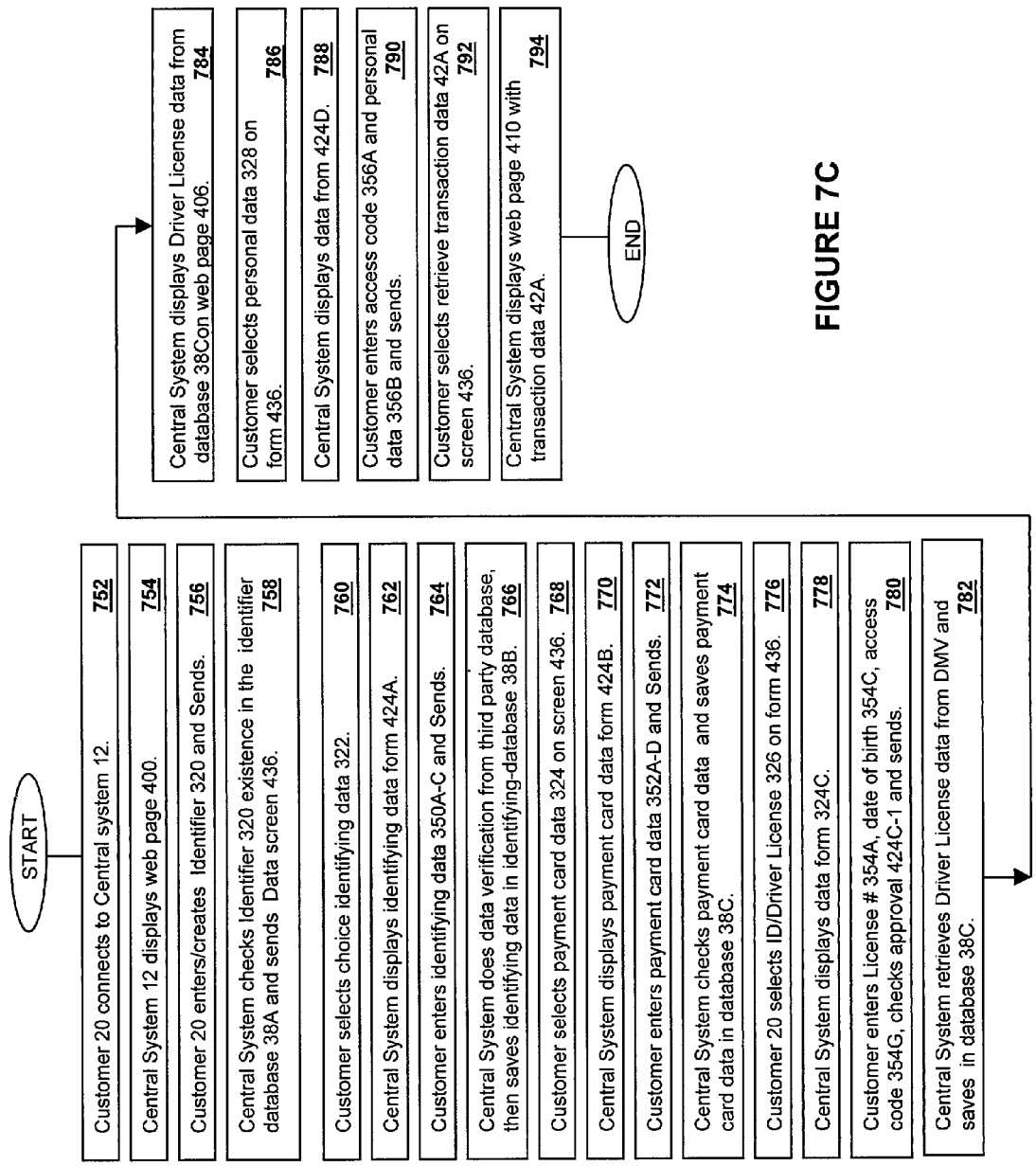
FIG. 7C is a block diagram that outlines an account function operation.

The operation of the central system to establish a customer account with the central system 12 is outlined in FIG. 7C. At step 752, the customer 20 connects to the central system 12. At step 754, the central system 12 displays the web page 400. At step 756, the customer enters/creates the Identifier 320 and Sends. At step 758, the central system checks for Identifier 320 in the identifier database 38A and sends the data screen 436. At step 760, the customer selects choice identifying data 322. At step 762, the central system displays identifying data form 424A. At step 764, the customer enters identifying data 350A-C and Sends. At step 766, the central system does data verification from a third party database and then saves the identifying data in identifying-database 38B. At step 768, the customer selects payment card data 324 on screen 436. At step 770, the central system displays the payment card data form 424B. At step 772, the customer enters the payment card data 352A-D and Sends. At step 774, the central system checks the payment card data and saves the payment card data in database 38C. At step 776, the customer 20 selects ID/Driver License 326 on form 436. At step 778, the central system displays the data form 324C. At step 780, the customer enters the License #354A, the date of birth 354C, the access code 354G, the checks approval 424C-1 and sends. At step 782, the central system retrieves the driver license data from DMV and saves in database 38C. At step 784, the central system displays driver license data from the database 38C on web page 406. At step 786, the customer selects the personal data 328 on form 436. At step 788, the central system displays data form 424D. At step 790, the customer enters access code 356A and personal data 356B and sends. At step 792, the customer selects retrieve transaction data 42A on screen 436. At step 794, the central system displays the web page 410 with the transaction data 42A.

Thus, the central system allows the party to open an integrated identity and payment device account and enables behind the scene facilitation of identity protection, personal data protection and integrated payment transactions. The central system stores private data of the person in a form that is not recognizable and traceable.

Further, this information is readily available using the portable wireless device 15. Additionally, if portable wireless device 15 is lost or stolen, the personal data, including the identification information, and the numbers of the payment cards is not accessible as they would be in a real physical wallet. Thus, the system provides a level of security to the party for their private data 25 because the wireless device 15 does not identify the owner by name, address, driver license and by payment card data.

Checking Account

Some people use their checking accounts and carry checkbooks to conduct payments transaction to merchants. Hence they carry their checkbooks with them. Many times a payment from a checking account is facilitated by use of a check card issued by banks. Some people also conduct a payment transaction using their checkbook to people other than a merchant such as friends, relatives or other acquaintances.

Figure 8B:
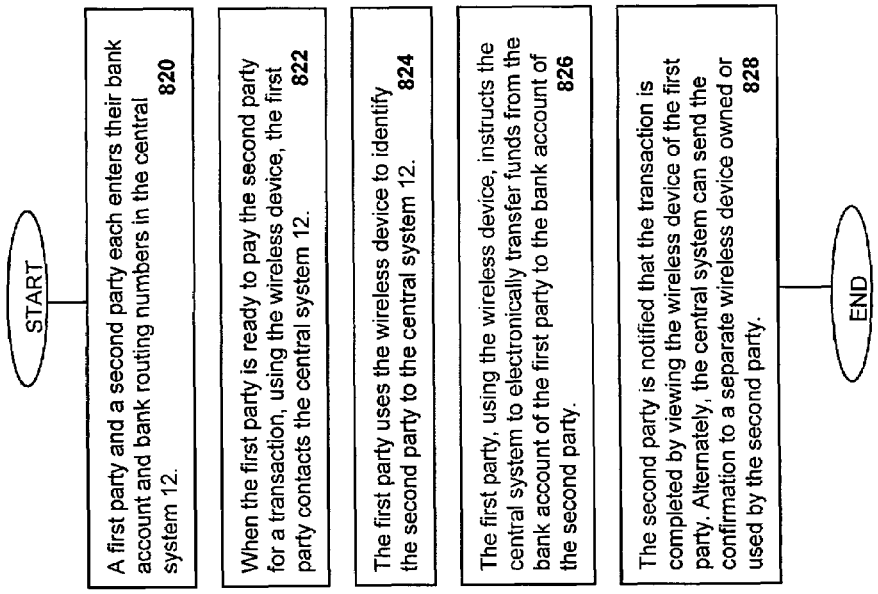
FIG. 8B is a block diagram that outlines how the system can be used to transfer funds between parties.
Figure 8A:
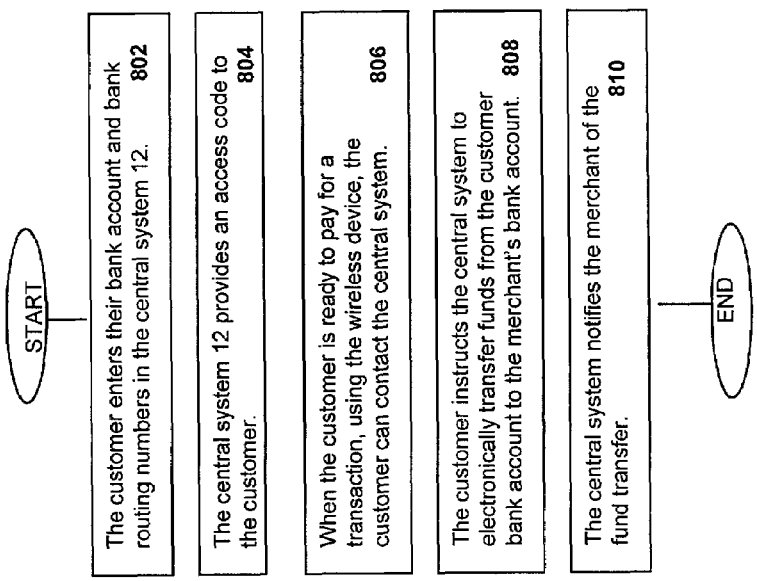
FIG. 8A is a block diagram that outlines how the system can be used to transfer funds to a merchant.

The present invention provides a way for the wireless device to be used to make payments to a merchant using a check card or a check. Referring to FIG. 8A, at step 802, the customer enters their bank account and bank routing numbers in the central system 12. At step 804, the central system 12 provides an access code to the customer. At step 806, when the customer is ready to pay for a transaction, using the wireless device, the customer can contact the central system. At step 808, the customer instructs the central system to electronically transfer funds from the customer bank account to the merchant's bank account. At step 810, the central system notifies the merchant of the fund transfer.

In this version, the central system allows the customer to pay for the transaction from their bank account without disclosing personal information about the customer. This minimizes the likelihood of the improper dissemination of the personal information of the customer.

The present invention also provides a way for the wireless device to be used to make payments to third parties using a check card or a check. Referring to FIG. 8B, at step 820, a first party and a second party each enter their bank account and bank routing numbers in the central system 12. At step 822, when the first party is ready to pay the second party for a transaction, using the wireless device, the first party contacts the central system 12. At step 824, the first party uses the wireless device to identify the second party to the central system 12. As an example, the second party can be referenced by the telephone number of the second party. At step 826, the first party, using the wireless device, instructs the central system to electronically transfer funds from the bank account of the first party to the bank account of the second party. At step 828, the second party is notified that the transaction is completed. Second party can be notified by viewing the wireless device of the first party. Alternately, the central system can send the confirmation to a separate wireless device owned or used by the second party.

In this version, the central system allows the first party to pay for the transaction from their bank account without disclosing personal information about the first party to the second party. This minimizes the likelihood of the improper dissemination of the personal information of the first party.

In summary, the central system 12 allows the customer 20 to use an integrated identity and payment device 15 in lieu of his physical wallet. The central system stores customer's private data 25 by separating the data elements in separate databases. The customer can conduct a payment transaction with the merchant 22 without disclosing the name, address, private data and credit card information of the customer 20 to the merchant 22. The customer can conduct ID/Driver License function for identification without carrying a physical ID/Driver license. The central system 12 minimizes the number of people, businesses and institutions that have access to the private information of the customer 20. This minimizes the opportunity for the private information of the customer 20 to be improperly disseminated, stolen or misused.

While the particular apparatus 10 and method as illustrated herein and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A payment system between a customer and a merchant, that does not disclose customer's bankcard data to the merchant, comprising:
   a. a central system; a portable wireless device; a merchant sales terminal displaying terminal identification data; the central system, the portable wireless device and the merchant terminal are on a global computer network; wherein the portable wireless device, without storing customer bank data and acting as a communication means is used to effect a private and secure payment transaction;
   b. the portable wireless device adapted with an interface means, at time of payment transaction, interfaces with a merchant system to receive the merchant sales terminal identification and a payment amount;
   c. the wireless device, that is part of a cellular telephone network, adapted with a payment function, wherein the payment function comprising, (i) a means to receive merchant identification, an amount identification, and a secret code of the customer, and (ii) means of wirelessly communicating the merchant identification, the amount identification, and the secret code to the central system;
   d. the central system comprising, (i) a customer storage function that stores data regarding a plurality of bankcard of the customer, each anchored with a caller id of the wireless device and a different secret code, (ii) a customer interface with the central system, enabling a customer to specify data regarding a plurality of bankcard of the customer and a corresponding secret code, (iii) a merchant storage function that stores data regarding a merchant and plurality of point of sale terminals of the merchant, each anchored with the merchant identification, (iv) a merchant interface with the central system enabling a merchant to specify address information on each point of sales registers enabling by the central system notification of payment approval to be sent to the individual point of sale terminal where the sales transaction originated;
   e. the central system further comprising, (i) a transaction function having means to receive caller id of the device, the merchant identification, the amount identification, and the secret code, and using the caller id and the secret code verifying the customer, retrieving the pre-stored bank data of the customer, (ii) a payment authorization function having means to create a payment authorization record and submit to a pre-existing authorization network, and await a payment approval record from the authorization network, and a (iii) a notification function having means to notify customer on the wireless device that the payment approval record has been received from the authorization network, and means to notify merchant, at a address pre-stored in the central system that a payment authorization for the amount from the customer has been approved by the authorization network;
   f. the central system yet further comprising, (i) a customer access function that enables the customer to view aggregated payment transactions organized by merchant and date, (ii) a merchant access function that enables the merchant to view aggregated sales transactions by store and terminal.

2. A paper-less personal identification system, in lieu of a driver license or an identification card of an identity owner, for showing personal identification to a requesting entity for establishing identification comprising:
   a. a portable wireless device adapted with an identification function that can (i) input a coded identification of the identity owner (ii) send an identification retrieval record with the coded identification and device identification to a central system (iii) receive personal identification information from the central system and (iv) display the personal identification information on the screen of the wireless device, wherein the wireless device, without storing customer sensitive identification data acting as a communication means facilitates security of identification data;

b. the personal identification information includes a plurality of items of the data owner from a group of, social security number, a driver license number, a picture of the person, a physical description of the person, a biometric identification of the person, and a signature sample of the person;

c. the personal identification information includes an indicia of reliability having been retrieved from an authorized central system;

d. the central system has access to the personal identification information of the identity owner, wherein, the central system receives at least a portion of the personal identification information from a governmental system;

e. an identity owner interface with the system enabling the identity owner to specify the personal identification information includes a plurality of items from a group of, social security number and a driver license number.

3. A secure payment system between a party A and a party B, without disclosing the sensitive bank data of the party A to the party B, comprising:

a. a wireless device, having a caller id associated with it, belonging to the party A, the wireless device does not keep bank data typically used in a payment transaction, the wireless device acting as a communication means to facilitate a secure payment to the party B, without disclosing bank data of the party A to the party B;

b. a central system which pre-stores the bank data of the party A and the party B and means to identify party A by caller id of the wireless device of the party A that is used to make a contact with the central system and verify the party A by a secret code entered into the device and pre-stored in the central system;

c. a payment function in the wireless device, at time of payment transaction from the party A to the party B, transmits a data record including at-least the party B's identification, the payment amount, the secret code, to the central system;

d. the central system having a function to retrieve the bank account data of the party A and the party B and facilitate a payment transaction from the party A to the party B using an existing payment authorization network;

e. a notification function in the central system, notifying the party A on the wireless device and the party B by a plurality of means that are pre-stored in the central system, of the completion of the payment transaction.

4. A private and secure personal data retrieval system, in lieu of a personal diary and papers, for use in day to-day activities, comprising:

a. a wireless device, having a caller id associated with it, the wireless device does not keep personal identity theft data typically saved in a personal papers and personal digital assistants, the wireless device acting as a communication means to facilitate access to such personal data from a central system;

b. the portable wireless device adapted with a personal data function that can (i) input a coded identification of the data owner and type of data to be retrieved, (ii) send an information retrieval record with the coded identification, data type identification, and device identification to a central system, (iii) receive personal information from a central system and (iv) display the personal information on the screen of the wireless device;

c. the central system having an (i) access function that enables entry of personal data information from a group of, financial data, medical data, private data, and identification data, (ii) a storage function that enables storage of personal data information of the person, from a group of, financial data, medical data, private data, and identification data.

* * * * *